June 7, 1932. P. H. DOWLING 1,862,211
ELECTRICAL TRANSLATING APPARATUS
Filed June 20, 1928   2 Sheets-Sheet 1

INVENTOR:
P. H. Dowling
by A. L. Verall
his attorney

INVENTOR:
P. H. Dowling,
by A. L. Vermall
his attorney.

Patented June 7, 1932

1,862,211

UNITED STATES PATENT OFFICE

PHILIP H. DOWLING, OF SWISSVALE, PENNSYLVANIA, ASSIGNOR TO THE UNION SWITCH & SIGNAL COMPANY, OF SWISSVALE, PENNSYLVANIA, A CORPORATION OF PENNSYLVANIA

ELECTRICAL TRANSLATING APPARATUS

Application filed June 20, 1928. Serial No. 286,985.

My invention relates to electrical translating apparatus, and particularly to apparatus which receives alternating current of one frequency and delivers current which is periodically varied at a different frequency.

I will describe several forms of translating apparatus embodying my invention, and will then point out the novel features thereof in claims.

Figure 1:
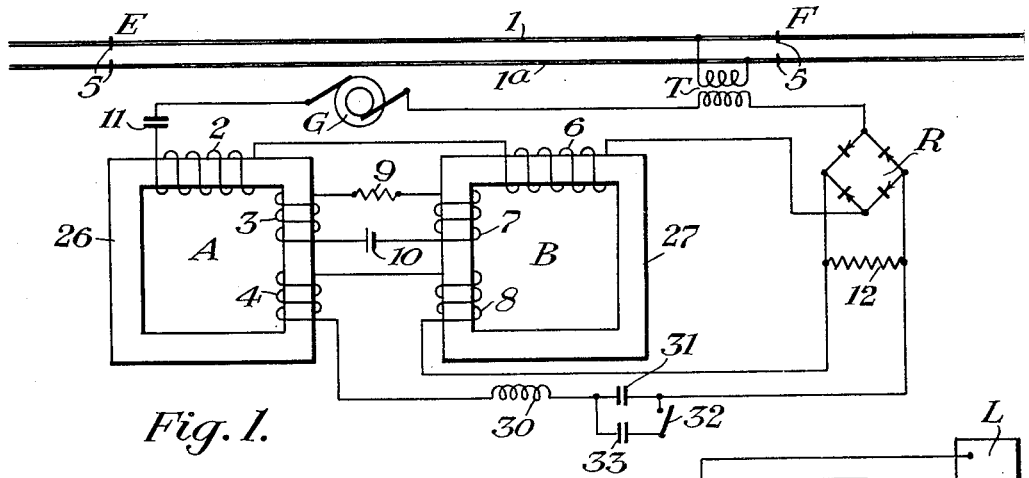
Figure 2:
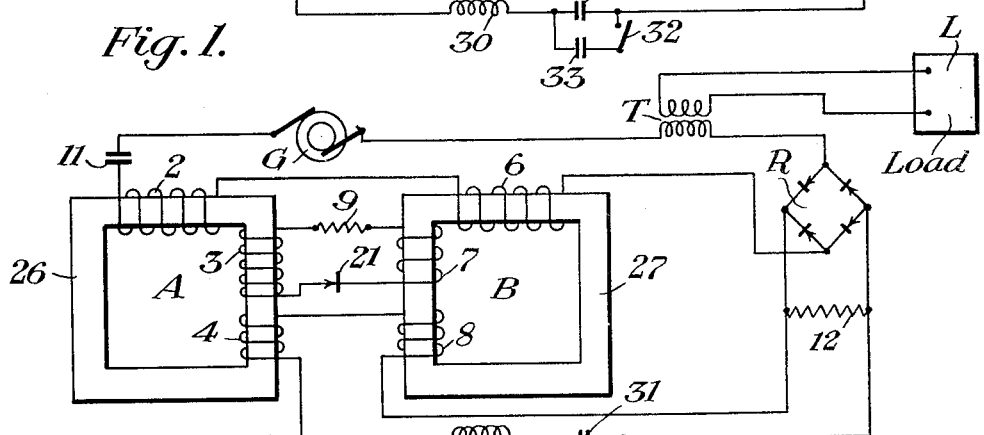
Figures 3, 4:
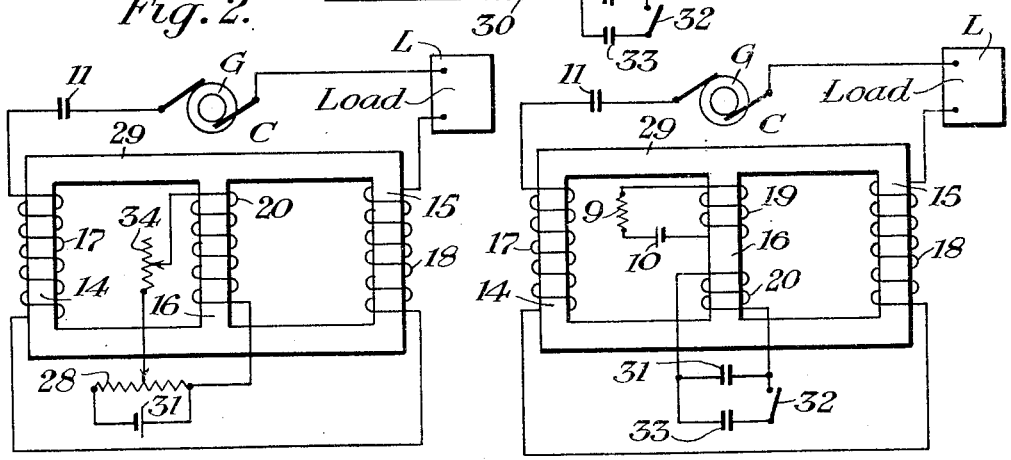
Figure 5:
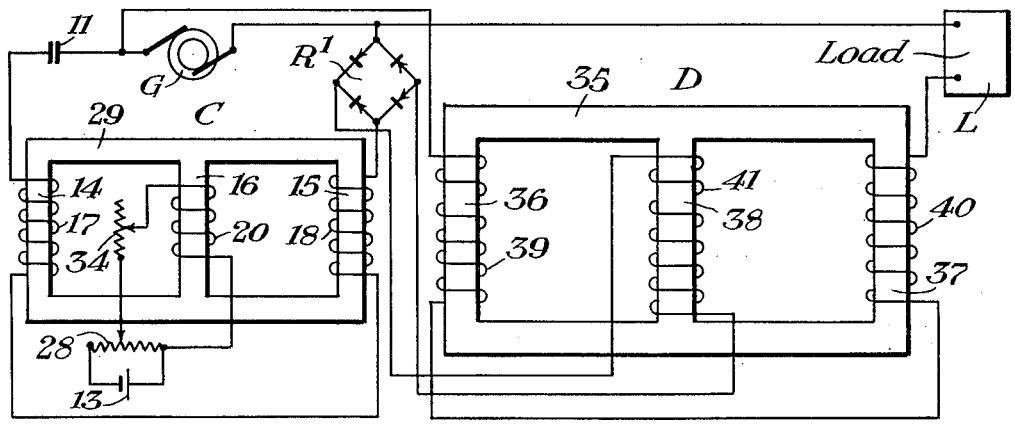
Figure 6:
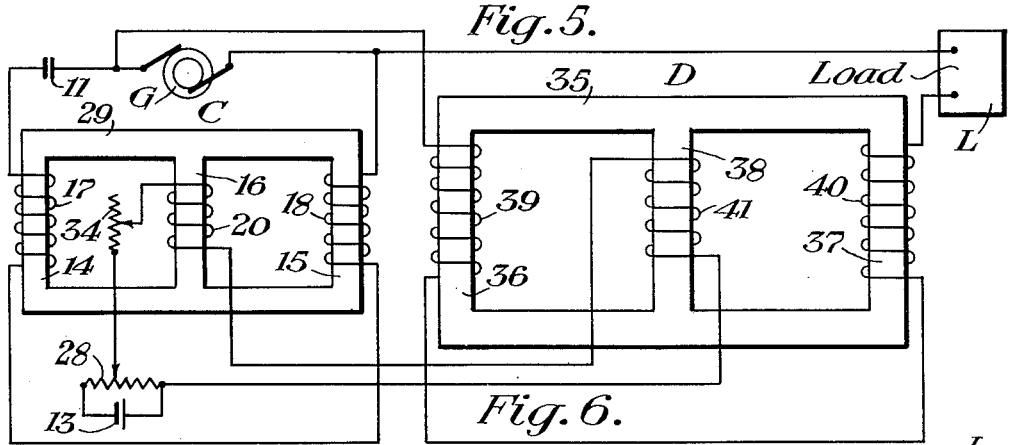
Figure 7:
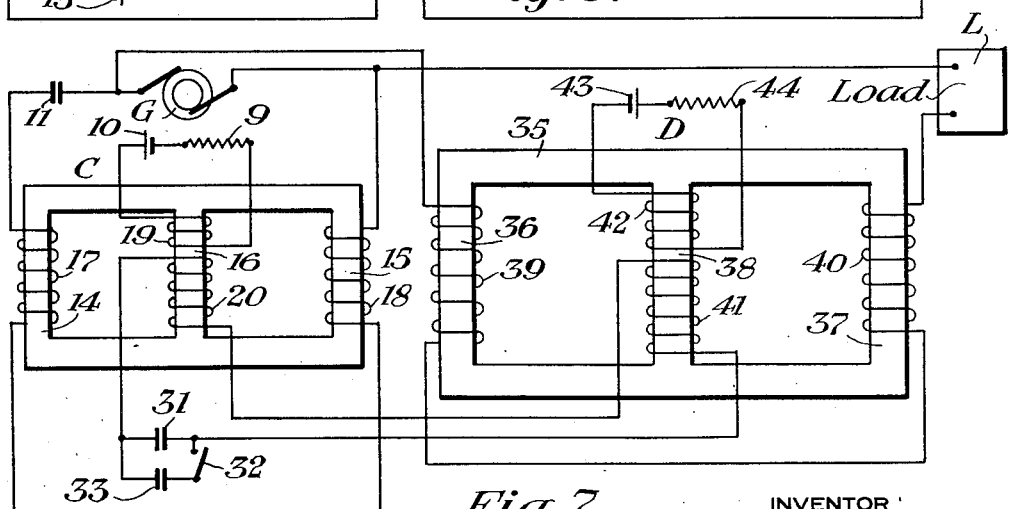

In the accompanying drawings, Fig. 1 is a diagrammatic view illustrating one form of apparatus embodying my invention. Figs. 2, 3 and 4 are diagrammatic views showing various modifications of the apparatus illustrated in Fig. 1. Figs. 5, 6 and 7 are views showing still other modified forms of electrical translating apparatus and also embodying my invention.

Similar reference characters refer to similar parts in each of the several views.

Referring first to Fig. 1, the apparatus comprises two similar transformers A and B. Transformer A comprises a magnetizable core 26 provided with three windings 2, 3 and 4, and transformer B comprises a magnetizable core 27 carrying three windings 6, 7 and 8. The apparatus is intended to supply periodically varied current to a load which is here illustrated as a stretch of railway track, the rails 1 and 1ª of which are divided by means of insulated joints 5 to form a track section E—F. A transformer, designated by the reference character T, has its secondary connected across the rails adjacent one end of the section. The primary of transformer T is supplied with alternating current from a suitable source such as a generator G in series with a condenser 11 and winding 2 of transformer A and winding 6 of transformer B. The alternating current thus supplied to windings 2 and 6 is also supplied, through a rectifier R, to an impedance 12. It follows, therefore, that the generator G supplies alternating current to the primary of transformer T and to windings 2 and 6, and unidirectional current to the impedance 12. The circuit including generator G may be tuned by condenser 11.

Winding 4 of transformer A and winding 8 of transformer B are connected in series in a circuit which also includes impedance 12 and condenser 31 and reactance 30. This circuit is tuned to resonance at the frequency of the variations desired in the current supplied to the track rails. The resonant frequency of this circuit may be changed by closing contact 32, whereupon, condenser 33 is connected in parallel with condenser 31 to change the tuning of this circuit. Windings 4 and 8 are connected in series opposition so that the electromotive force induced in winding 4 by alternating flux in core 26 due to the current in winding 2 opposes the electromotive force induced in winding 8 by the alternating flux in core 27 due to current in winding 6. Winding 3 of transformer A and winding 7 of transformer B are connected in series opposition in a circuit which includes an impedance 9 and a source of unidirectional current here shown as a battery 10. The battery 10 could, of course, be replaced by a rectifier receiving energy directly from generator G. The unidirectional fluxes created in cores 26 and 27 by the currents in windings 3 and 7, respectively, are adjusted to bring the permeability of these cores to a value for which small changes in the flux in these cores will cause comparatively large changes in the impedances of core 26. Furthermore, the parts are so arranged that current supplied to the circuit including windings 4 and 8 by the potential drop across impedance 12 aids the flux created in the cores by current in windings 3 and 7.

In explaining the operation of the apparatus I will first assume that switch 32 is open and that condenser 31 is discharged. The potential drop across impedance 12 causes a charging current to flow in the resonant circuit including windings 4 and 8. This current charges condenser 31 and increases the unidirectional fluxes in cores 26 and 27. As a result of these increased fluxes, the impedances of windings 2 and 6 are decreased so that the current supplied to impedance 12 increases. The current in the circuit including windings 4 and 8 therefore increases, and the potentials of the charge in condenser 31 also increases, this operation continuing until a condition of equilibrium is reached at which the potential difference across condenser 31 is equal to the potential drop across impedance 12. When this occurs, the current in the resonant circuit including windings 4 and 8, of course ceases, and the unidirectional fluxes in cores 26 and 27 then returns to the value determined by the currents in windings 3 and 7. As a result, the impedances of windings 2 and 6 are increased, and the current in impedance 12, and hence the potential drop across this impedance, are reduced. The potential drop across condenser 31 is then greater than the potential drop across impedance 12, and a current is created in the resonant circuit including windings 4 and 8 which is in a direction contrary to the charging current supplied to this circuit by the potential drop across impedance 12. Unidirectional fluxes are therefore created in cores 26 and 27 which oppose the fluxes created by current in windings 3 and 7, and the impedances of windings 2 and 6 are increased so that the potential drop across winding 12 is still further decreased. This operation continues until a condition of equilibrium is reached, whereupon, the potential drop across impedance 12 again predominates over the charge on condenser 31 and the cycle of operations just traced is then repeated. It will be seen that the change of the current in windings 4 and 8 takes place at a rate which depends upon the natural period of this circuit. Since the current supplied to the circuit including windings 2 and 6 and the primary of transformer T by generator G is varied in accordance with variations in the current in the resonant circuit, it will be apparent that the rails of section E—F are supplied with alternating current of the frequency of generator G, but which is varied at one half the resonant frequency of the circuit including windings 4 and 8.

It will be plain from the foregoing that if switch 32 is closed, the operation of the apparatus will be similar to that just described with the exception that the frequency of the periodic variations in the current supplied to the track rails of section E—F will then have a different value depending upon the new value of the natural frequency of the resonant circuit including the windings 4 and 8. Obviously, the frequency of the periodic variations in the trackway current may be adjusted to any reasonable value by properly proportioning the parts of the circuit including windings 4 and 8.

Referring now to Fig. 2, the apparatus is the same as has already been described in connection with Fig. 1 with the exception that the normal value of the unidirectional fluxes in cores 26 and 27 is adjusted by providing one of windings 3 or 7 with more turns than the other so that the alternating fluxes supplied to cores 26 and 27 create a net alternating electromotive force in the circuit including these windings. A rectifier 21 is connected in series with these windings so that current can flow in the windings only during half cycles for which the polarity of the current is such as to produce unidirectional fluxes in the desired direction.

The purpose of impedance 9 in both Figs. 1 and 2 is to limit the current induced in windings 3 and 7 by changes in the fluxes in the cores 26 and 27 at the frequency of the resonant circuit including windings 4 and 8.

Referring now to Fig. 3, the reference character C designates a transformer comprising a magnetizable core 29 having a bridging member 16 provided with a winding 20. One leg 14 of this core is provided with a winding 17 and the other leg 15 carries a winding 18. Windings 17 and 18 are connected in series with the generator G and the load which is here designated diagrammatically at L. The windings 17 and 18 are connected in series in such manner that at an instant the alternating fluxes created by currents in these windings are in opposition in the bridging member 16 and it follows that under normal conditions no electromotive force is induced in winding 20. The winding 20 is included in a circuit which includes a variable impedance 34 and an impedance 28 which has its terminals connected with a battery 13. The potentiometer arrangement including impedance 28 therefore supplies winding 20 with a unidirectional current which creates, in member 16, a unidirectional flux. Since the member 16 is common to the magnetic paths traversed by fluxes from both windings 17 and 18, it will be plain that the impedances of these windings depend upon the flux created in member 16 by current in winding 20. In the preferred form of my invention I adjust the parts so that the current delivered to the winding 20 creates a unidirectional flux in member 16 of such a magnitude that core 29 is brought to a point substantially in the middle of the straight portion of its saturation curve. The impedance 34 may be varied to change the time constant of the circuit including winding 20. The condenser 11 is so adjusted that the circuit including the windings 17 and 18 would be tuned to resonance at the frequency of the current delivered by generator G if the impedances of windings 17 and 18 were reduced to a value somewhat below their normal values.

In explaining the operation of the apparatus I will first assume that the current in the circuit including winding 20 is increasing as would be the case if this circuit were suddenly closed. Of course this increase of current takes place at a rate which depends upon the time constant of the circuit. This increase in current increases the unidirectional flux in core 29. As a result the impedances of windings 17 and 18 are decreased and the current through these windings and hence through load L is increased. The alternating fluxes in core 29 are also increased and this increase in the alternating fluxes in core 29 decreases the permeability of the core to the unidirectional flux supplied by current in winding 20. The effect of this change in permeability is to abstract magnetic lines from the winding 20. This change in magnetic lines induces in winding 20 an electromotive force which causes a current in the winding in such direction as to aid the current normally supplied to the winding by the potential drop across impedance 28. This rise in current of course takes place at the rate which depends upon the time constant of the circuit. This operation continues, the current in winding 20 increasing and the impedances of windings 17 and 18 decreasing, until the core 29 is brought to the upper knee of its saturation curve. At this point the impedance of windings 17 and 18 have been so diminished that the circuit including these windings and the load is then resonant at the frequency of the current delivered by generator G. There has taken place, then, a substantial increase in the current delivered to the load. At a point slightly above the knee of the saturation curve of core 29 the change in lines of magnetic force linking winding 20 substantially ceases, so that the induced current in this winding is discontinued. The impedances of windings 17 and 18 therefore increase, again detuning the circuit including these windings and the load, and reducing the current supplied to the load. As a result, the alternating fluxes created in core 29 are decreased so that the permeability of member 16 increases. The effect of this change is to add magnetic lines of force to the member 16, thereby inducing in winding 20 an electromotive force which opposes the potential drop across impedance 28. This operation continues until the current in winding 20 is reduced below its normal value and until the core 29 is brought to the lower knee of its saturation curve. When this condition has been reached the flux density in member 16 becomes constant and the induced current in winding 20 returns to zero. Due to the potential drop across impedance 28 the current in winding 20 then again increases, thereby recommencing the cycle of operation just traced. It will be seen, therefore, that the apparatus shown in Fig. 3 operates to vary the current delivered to the load periodically at a frequency which depends upon the time constant of the circuit including winding 20. If it is desired to change the frequency of these periodic variations, it may be accomplished by changing the value of impedance 34, thereby changing the time constant of the associated circuit, and thereafter making a corresponding adjustment in the impedance 28 to again bring the core 29 to a point substantially at the middle of the straight portion of its saturation curve. It follows that the apparatus may be adjusted to periodically vary the current supplied to the load at any reasonable frequency.

Referring now to Fig. 4, the apparatus is similar to that shown in Fig. 3, but winding 20 is provided with a resonant circuit, the natural period of which may be varied by switch 32 to include one or both of condensers 31 and 33 in the circuit. Core 29 is adjusted to the desired point of its saturation curve by means of winding 19 located on member 16 and connected with battery 10 through impedance 9.

With the apparatus here shown and assuming that switch 32 is open, increases in the unidirectional flux in member 16 decrease the impedance of windings 17 and 18, thereby increasing the current supplied to the load, and increasing the alternating fluxes in the core 29. As a result, the permeability of those portions of core 29 which are traversed by the unidirectional flux from member 16 is decreased. Magnetic lines are therefore abstracted from member 16, and the linkage of these abstracted lines with winding 20, induces in that winding an electromotive force which charges condenser 31. The current flowing through winding 20 during the charge of condenser 31 increases the unidirectional flux in member 16 and still further decreases the impedance of windings 17 and 18. This operation continues until the core 29 reaches the upper knee of its saturation curve, at which point the circuit including windings 17 and 18 is operating at approximately the peak of its resonant curve. The condenser 31 then commences to discharge, sending through winding 20 a current which tends to decrease the unidirectional flux from member 16. As a result the impedances of windings 17 and 18 are increased, and the current supplied to the load is decreased. The change in the alternating fluxes in the core 29 increases the permeability of the core to unidirectional flux supplied by current in winding 19, and lines are therefore added to member 16, which lines link winding 20 to induce a current which aids the current of discharge of condenser 31. It will be plain from the foregoing that the apparatus operates to vary the current supplied to load L at a frequency which depends upon the natural period of the circuit including winding 20. Since the period of this circuit may be changed by changing the constants of the circuit, it will be manifest that the apparatus can be made to vary the current delivered to the load to any desired frequency.

In the form of apparatus shown in Fig. 5, the transformer C is similar to that shown in Fig. 3. Associated with this transformer is a second transformer designated by the reference character D and comprising a magnetizable core 35 having a bridging member 38 provided with a winding 41. One leg 36 of core 35 is provided with a winding 39 and the other leg 37 of core 35 is provided with a winding 40. The generator G supplies alternating current to windings 17 and 18 of transformer C in series in the manner already described in connection with Fig. 3. Furthermore, the generator G supplies current through a rectifier R¹ to winding 41 of transformer D. It will be plain, therefore, that winding 41 and rectifier R¹ may be considered as load L of Fig. 3, winding 41 being supplied with unidirectional current which is periodically varied at a frequency which depends upon the time constant of the circuit including winding 20 of transformer C. Windings 39 and 40 of transformer D are connected in series with load L across generator G, these windings being so disposed that the alternating fluxes created thereby are neutralized in the bridging member 38 of transformer D. Each time the unidirectional current in winding 41 of transformer D increases the impedances of windings 39 and 40 are decreased so that the current supplied to the load is increased. When the current in winding 41 is decreased, the consequent increase in the impedances of windings 39 and 40 decreases the current supplied to the load. It will be plain that the transformer D may be so constructed that a comparatively small change in the current supplied to winding 41 produces a comparatively large change in the current supplied to the load L. The transformer C may, therefore be made comparatively small and serves to control the variations in the current supplied to winding 41 of transformer D. Transformer D on the other hand, may be comparatively large, so as to amplify the current changes in winding 41 and supply a comparatively large current with clearly pronounced variations to the load L.

In Fig. 6, the apparatus is similar to that shown in Fig. 5, except that winding 41 of transformer D is connected in series with winding 20 of transformer C. The operation of the apparatus will be readily understood from the discussion of Fig. 5, it being noted that the periodic variations in the current in winding 20 of transformer C are communicated to winding 41 of transformer D, thereby causing corresponding variations in the current supplied to the load.

Referring now to Fig. 7, the transformer C is the same as shown in Fig. 4, with the exception that winding 41 of transformer D is connected in series with winding 20. In this form of the apparatus it will be seen that the current in winding 41 is alternating in character. In order to adjust the magnetization of core 35 to the optimum point on its saturation curve, member 38 of transformer D is provided with a winding 42 which is connected with a battery 43 through impedance 44. The current supplied to winding 42 by battery 43 creates a unidirectional flux in core 35 which insures that the core will be worked at the most desirable value of its permeability. The operation of the apparatus will be readily understood without tracing it in detail, the periodic variations in the circuit including windings 41 and 20 causing corresponding variations in the current supplied to the load L through windings 39 and 40 of transformer D.

Apparatus embodying my invention is suitable for, though in no way limited to, use in supplying periodically varied current to the track rails of a stretch of railway track, as shown in Fig. 1. The current thus supplied to the track rails may be employed to control train governing means which is selectively responsive to the frequency of variation of the current in the rails. One system of apparatus operating on this principle is disclosed in an application for Letters Patent of the United States, Serial No. 166,407, filed Feb. 7, 1927, by P. N. Bossart, for railway traffic controlling apparatus. For this purpose the generator G may supply alternating current of commercial frequency such, for example, as 60 or 100 cycles per second, and the translating apparatus herein disclosed may be proportioned to vary this current at frequencies of the order of 100 cycles per minute, though these particular values are mentioned only by way of example, and are not essential to my invention.

Although I have herein shown and described only a few forms of electrical translating apparatus embodying my invention, it is understood that various changes and modifications may be made therein within the scope of the appended claims without departing from the spirit and scope of my invention.

Having thus described my invention, what I claim is:

1. In combination, a magnetizable core provided with two magnetic paths having a bridging member in common, two windings one on each said path, a first circuit including a source of alternating current and said two windings in series in such manner that the alternating fluxes created in said two paths are in opposition in said bridging member, a second circuit inductively related with said bridging member and including an impedance element for determining the time constant of such second circuit, and means including said second circuit for creating in said bridging member a flux which varies at a rate depending upon the time constant of such circuit and which flux is sufficient at times to give said two windings such impedance that said first circuit is tuned to resonance at the frequency of said source.

2. In combination, a first magnetizable core, a first winding on said core, a load, means for supplying alternating current to said first winding and said load in series, a second core, a second winding on said second core, a third winding on said first core, a circuit including said second and third windings, a fourth winding on said second core, and means for supplying alternating current to said fourth winding to produce in said circuit a current which varies at a frequency which depends upon the time constant of said circuit.

3. In combination, a first magnetizable core, a first winding on said core, a load, means for supplying alternating current to said first winding and said load in series, a second core, a second winding on said second core, a third winding on said first core, a tuned circuit including said second and third windings, a fourth winding on said second core, and means for supplying alternating current to said fourth winding to produce in said circuit a current which varies at a frequency which depends upon the resonant frequency of said circuit.

4. In combination, a magnetizable core, a winding on said core, a load, a first circuit including said winding and said load and a source of periodic current and tuned substantially to resonance at the frequency of said source, and a second circuit inductively related with said core and including an impedance element for determining the time constant of such second circuit and operating to periodically vary the current in said first circuit at a frequency which depends upon the time constant of said second circuit and which is substantially lower than the frequency of said source.

5. In combination, a magnetizable core, a winding on said core, a first circuit for supplying periodic current to said winding, a second winding on said core, and a second circuit for said second winding electrically isolated from said first circuit and including an impedance element for determining the time constant of such second circuit and operating to vary the current in said first circuit at a frequency which depends upon the time constant of such second circuit and which is substantially lower than the frequency of such periodic current.

6. In combination, a magnetizable core provided with two magnetic paths having a bridging member in common, two windings one on each said path, a first circuit including a source of periodic current and a condenser and said two windings in series in such manner that the alternating fluxes created in said two paths are in opposition in said bridging member, a second circuit electrically independent of said first circuit and inductively related with said bridging member and including an impedance element for determining the time constant of such second circuit, and means including said second circuit for creating in said bridging member a flux which varies at a rate dependent upon the time constant of such second circuit to tune said first circuit periodically to resonance at the frequency of said source.

In testimony whereof I affix my signature.

PHILIP H. DOWLING.